Patented Jan. 14, 1936

2,027,955

UNITED STATES PATENT OFFICE 2,027,955

INTERMEDIATES FOR DYES

Ernest George Beckett, Grangemouth, Scotland, assignor to Imperial Chemical Industries Limited, a corporation of Great Britain No Drawing. Application August 14, 1934, Serial No. 739,806. In Great Britain August 18, 1933

6 Claims. (Cl. 260—64)

According to this invention I manufacture new 2-aroyl-4-chloro-5-nitrobenzoic acids by condensing 4-chloro-5-nitro-phthalic anhydride with an aromatic hydrocarbon of the benzene or naphthalene series capable of undergoing the Friedel-Craft condensation.

Also according to the invention I reduce the said new 2-aroyl-4-chloro-5-nitrobenzoic acids to new 2-aroyl-4-chloro-5-aminobenzoic acids with known reducing agents.

The 2-aroyl-4-chloro-5-aminobenzoic acids so obtainable may be cyclized to derivatives containing the anthraquinone nucleus.

4-chloro-5-nitro-phthalic anhydride, which is new, may be made by mononitrating 4-chlorophthalic anhydride, with a mixture of sulphuric and nitric acids and then separating the two isomers, by means of the sodium salts of the acids, as described more fully below.

The new compounds of this invention are valuable intermediates for dyes.

The following examples in which the parts are by weight, illustrate but do not limit the invention.

Example 1

Five (5) parts of dry 4-chloro-5-nitrophthalic anhydride made as described below, are dissolved in 24 parts of benzene and 10 parts of aluminium chloride are added slowly in the cold in one hour. The mixture is heated slowly to 60° C. and then kept at this for several hours. The benzene is removed by steam distillation and solid matter filtered off, washed with dilute hydrochloric acid and with water, dissolved in hot dilute soda ash solution, and filtered to remove foreign matter. The 4(5)-chloro-5(4)-nitro-2-benzoylbenzoic acid is precipitated from the filtrate by hydrochloric acid, washed and dried. Yield, 6–6½ parts.

Example 2

Three (3) parts of the product of Example 1 are dissolved in dilute ammonia. To this solution is added a suspension of ferrous hydroxide in water made by adding 10 parts of concentrated ammonia to a solution of 18 parts of crystallized ferrous sulphate in 100 parts of water. The mixture is warmed to about 70° C. filtered, and hydrochloric acid added to the filtrate until no further precipitation takes place, the precipitate filtered off and dried.

1 part of this product may be dissolved in 10 parts of 100% sulphuric acid and the solution heated to 170° C. and kept at this for 10 minutes.

On pouring the cooled solution into water 2-amino-3-chloro-anthraquinone is precipitated.

Example 3

Five (5) parts of 4-nitro-5-chlorophthalic anhydride are dissolved in 30 parts of chlorobenzene and 9 parts of aluminium chloride are added in the cold with stirring. The temperature is raised to 60° C. and kept at this for several hours and the product isolated as in Example 1. Yield, 7 parts.

Example 4

Five (5) parts of 4-nitro-5-chlorophthalic anhydride and 5 parts of naphthalene are dissolved in 20 parts of warm o-dichlorobenzene. 10 parts of aluminium chloride is then added slowly and then the whole heated to 60° C. for several hours. The product is isolated as described above. Yield, 6 parts.

4-chloro-5-nitrophthalic anhydride is made as follows:

500 parts of the acid sodium salt of 4-chlorophthalic acid are stirred into 800 parts of 99% sulphuric acid at 80° C. When almost all the salt is dissolved, 540 parts of a nitrating mixture (made by mixing 5 parts by weight of 20% oleum with 3 parts of 95% nitric acid) are added in two hours at 80° C. The mass is then heated at 90° C. for two hours, cooled and then carefully diluted with water to 5000 parts. The solution is heated to 90° C. and 907 parts of dry calcium hydroxide are slowly added with very good stirring. The mixture is stirred for 1 hour at 90° C. and filtered hot from the precipitated calcium sulphate. This calcium sulphate is boiled up again in 2000 parts of water, filtered again and washed with hot water until the volume of the filtrates and washings is 10000 parts.

On cooling most of the 4-chloro-5-nitrophthalic acid precipitates as the acid sodium salt. This is purified by recrystallizing from 15–20 times its weight of water.

I claim:

1. Compounds of the general formula

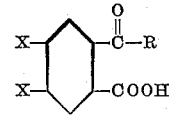

wherein R represents a hydrocarbon radical of the benzene or naphthalene series, one X stands for chlorine and the other X stands for NO₂ or NH₂.

2. 2-benzoyl-4-chloro-5-amino-benzoic acid.

3. The process which comprises condensing 4- chloro-5-nitrophthalic anhydride with an aromatic hydrocarbon of the benzene or naphthalene series by means of aluminum chloride.

4. The process which comprises condensing 4-chloro-5-nitrophthalic anhydride with an aromatic hydrocarbon of the benzene or naphthalene series by means of aluminum chloride, and reducing the nitro compound so formed to the corresponding amine.

5. The process which comprises condensing 4-chloro-5-nitrophthalic anhydride with benzene by the Friedel-Craft reaction to form the 2-benzoyl-4-chloro-5-nitrobenzoic acid.

6. The process which comprises condensing 4-chloro-5-nitrophthalic anhydride with benzene by the Friedel-Craft reaction to form the 2-benzoyl-4-chloro-5-nitrobenzoic acid, and reducing the nitro compound so formed to the amine.

ERNEST GEORGE BECKETT.